(12) United States Patent
Bessette

(10) Patent No.: US 7,503,222 B1
(45) Date of Patent: Mar. 17, 2009

(54) SPAN ADJUSTMENT FOR SUSPENDED MOVEMENT MEASURING DEVICES

(75) Inventor: Tyler Jon Bessette, Milford, CT (US)

(73) Assignee: Ashcroft, Inc., Stratford, CT (US)

( * ) Notice: Subject to any disclaimer, the term of this patent is extended or adjusted under 35 U.S.C. 154(b) by 0 days.

(21) Appl. No.: 12/047,030

(22) Filed: Mar. 12, 2008

(51) Int. Cl.
*G01L 19/02* (2006.01)
(52) U.S. Cl. ...................................... 73/740
(58) Field of Classification Search .............. 73/740, 73/711, 712
See application file for complete search history.

(56) References Cited

U.S. PATENT DOCUMENTS

| | | | |
|---|---|---|---|
| 3,256,740 A * | 6/1966 | Tate et al. | 73/701 |
| 4,055,085 A | 10/1977 | Wetterhorn | |
| 4,237,738 A | 12/1980 | Wetterhorn | |
| 4,240,298 A | 12/1980 | Wetterhorn | |
| 4,246,796 A * | 1/1981 | Wetterhorn | 73/732 |
| 4,444,057 A | 4/1984 | Wetterhorn | |
| 6,295,876 B1 | 10/2001 | Busch | |

* cited by examiner

*Primary Examiner*—Andre J Allen
(74) *Attorney, Agent, or Firm*—McCarter & English, LLP

(57) ABSTRACT

The present disclosure provides for systems and methods for fabricating suspended movement measuring devices, e.g., a pressure gauge, thermometer or the like. More particularly, the present disclosure provides for systems and methods for fabricating suspended movement measuring device assemblies having span adjustment. In one embodiment, the present disclosure provides for systems and methods for fabricating suspended movement measuring device assemblies having span adjustment, wherein the measuring device may be calibrated from the front of the dial of the measuring device.

21 Claims, 4 Drawing Sheets

SPAN ADJUSTMENT FOR SUSPENDED MOVEMENT MEASURING DEVICES

BACKGROUND

1. Technical Field

The present disclosure relates to a measuring device assembly and method for fabricating measuring device assemblies and, more particularly, to suspended movement measuring device assemblies having span adjustment.

2. Background Art

Measuring devices, such as instruments and gauges used for measuring temperature and pressure, have innumerable uses in industry. For example, pressure gauges to measure the pressure of process media are well known. Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout).

Price competition between the various measuring device manufacturers is a factor in the marketplace. Therefore, a savings in the cost of material, labor and the like by a manufacturer can have a significant effect on that manufacturer's sales, market share and margins. Therefore, a constant need exists among these manufacturers to develop more cost effective manufacturing techniques.

In general, forms of measuring devices of the suspended movement type are disclosed, for example, in U.S. Pat. Nos. 4,055,085; 4,237,738; 4,246,796; 4,444,057 and 6,295,876, each incorporated herein by reference. For example, U.S. Pat. No. 4,055,085 (the "'085 patent") discloses a pressure gauge or the like in which the amplifier movement is supported on the free end of a condition responsive element (e.g., a Bourdon tube or the like) for floating conjointly with displacement of the element end. An actuator extends into the motion path of the floating amplifier to define a pivot axis for a hinged gear sector arm of the amplifier. In pivoting about the actuator axis, the sector arm operably drives a rotatable output shaft supporting a pointer or indicator or the like opposite a graduated dial face.

The '085 patent also discloses designs for suspended movement measuring devices having span adjustment. In general, span adjustment is for effecting pointer or indicator travel coincident with the dial span encountered by the measuring device on being subject to a full range of condition changes (e.g., pressures) through which it is intended to operate. Typically, this span adjustment system/method utilizes a square socket with a tapered screw, and the suspended movement measuring device may be calibrated with the dial in place. However, this span adjustment system/method adds costly machining operations to the socket and/or to the measuring device (e.g., mounting features for the dial, a threaded hole for a tapered screw, alignment/mounting groove for an actuator). In addition, this system/method is typically only used on brass systems due to the complexity of the parts, as stainless steel parts, for example, would generally be too expensive to utilize in a similar or like design.

Another existing system/method for suspended movement measuring devices having span adjustment typically includes a wire and block assembly. In general, this assembly is difficult to adjust, and is typically susceptible to shifts in shock, due to the construction of the assembly, for example. In addition, generally the dial of the measuring device must be removed in order to calibrate the measuring device, which typically makes calibration difficult. For example, with no dial, an operator cannot see the measurement tick marks. In general, this span adjustment system/method for suspended movement measuring devices cannot be automated.

Thus, despite efforts to date, a need remains for cost effective and efficient systems/methods that provide for suspended movement measuring devices having span adjustment. In addition, a need remains for systems/methods that provide for suspended movement measuring devices having span adjustment, where the systems/methods do not add costly machining operations to the measuring device, may be calibrated from the front of the dial, reduce shifts from shocks to the measuring device, and may be automated. These and other inefficiencies and opportunities for improvement are addressed and/or overcome by the systems and methods of the present disclosure.

SUMMARY

The present disclosure provides an advantageous measuring device assembly and method for fabricating advantageous measuring device assemblies. In exemplary embodiments, the present disclosure provides for improved systems and methods for fabricating suspended movement measuring device assemblies (e.g., a pressure gauge, thermometer or the like) having span adjustment. In one embodiment, the present disclosure provides for systems and methods for fabricating suspended movement measuring device assemblies having span adjustment, wherein the measuring device may be calibrated from the front of the dial of the measuring device.

The present disclosure provides for a measuring device system including a bracket of a first measuring device that includes an adjustment earn; a condition responsive element of the first measuring device that includes an element inlet and an output end configured to produce motion in response to condition changes (i) received at the element inlet and (ii) to which the condition responsive element is sensitive; an amplifier that includes a sector arm, wherein the amplifier is secured to the output end of the condition responsive element for communicating correlated but amplified motion of the condition responsive element to an indicator shaft for operating a measuring device indicator relative to condition changes on a dial face of the first measuring device; an actuator that includes at least a first actuator segment that is positioned within an elongated slot of the sector arm for defining a pivot axis for the sector arm to enable amplifier operation; a second actuator segment of the actuator that is engagably pre-loaded against the adjustment cam to push and ride against a cam surface of the adjustment cam; and wherein the adjustment cam is configured and dimensioned so that the cam surface that pushes against the second actuator segment changes the position of the first actuator segment in the elongated slot of the sector arm when the adjustment cam is rotated to adjust the span of the first measuring device. The present disclosure also provides for a measuring device system further including a third actuator segment of the actuator and a fourth actuator segment of the actuator; wherein the third actuator segment of the actuator is securely engaged with a bracket push plate of the bracket; and wherein the fourth actuator segment of the actuator is securely attached to a bracket weld plate of the bracket.

The present disclosure also provides for a measuring device system further including a socket; wherein the bracket is securely attached to the socket. The present disclosure also provides for a measuring device system, wherein the condition responsive element is a Bourdon tube and the first measuring device is a pressure measuring device. The present disclosure also provides for a measuring device system, wherein the actuator is an elongated metal wire. The present disclosure also provides for a measuring device system, wherein the adjustment cam is plastic. The present disclosure also provides for a measuring device system, wherein the adjustment cam includes at least two positive stops.

The present disclosure also provides for a measuring device system, wherein the cam surface that pushes against the second actuator segment is a spline. The present disclosure also provides for a measuring device system, wherein the adjustment cam further includes a slot that retains the second actuator segment in the adjustment cam. The present disclosure also provides for a measuring device system, wherein the cam further includes a cam adjustment feature located on the front side of the bracket to allow an operator to adjust the span of the first measuring device from the front of the first measuring device with the dial face and the measuring device indicator in place on the first measuring device.

The present disclosure also provides for a method for manufacturing a measuring device system including providing a bracket of a first measuring device that includes an adjustment cam; providing a condition responsive element of the first measuring device that includes an element inlet and an output end configured to produce motion in response to condition changes (i) received at the element inlet and (ii) to which the condition responsive element is sensitive; providing an amplifier that includes a sector arm, wherein the amplifier is secured to the output end of the condition responsive element for communicating correlated but amplified motion of the condition responsive element to an indicator shaft for operating a measuring device indicator relative to condition changes on a dial face of the first measuring device; providing an actuator that includes at least a first actuator segment that is positioned within an elongated slot of the sector arm for defining a pivot axis for the sector arm to enable amplifier operation; providing a second actuator segment of the actuator that is engagably pre-loaded against the adjustment cam to push and ride against a cam surface of the adjustment cam, and wherein the adjustment cam is configured and dimensioned so that the cam surface that pushes against the second actuator segment changes the position of the first actuator segment in the elongated slot of the sector arm when the adjustment cam is rotated to adjust the span of the first measuring device; and rotating the adjustment cam to adjust the span of the first measuring device.

The present disclosure also provides for a method for manufacturing a measuring device system further including providing a third actuator segment of the actuator and a fourth actuator segment of the actuator; wherein the third actuator segment of the actuator is securely engaged with a bracket push plate of the bracket; and wherein the fourth actuator segment of the actuator is securely attached to a bracket weld plate of the bracket. The present disclosure also provides for a method for manufacturing a measuring device system further including providing a socket, and wherein the bracket is securely attached to the socket. The present disclosure also provides for a method for manufacturing a measuring device system, wherein the condition responsive element is a Bourdon tube and the first measuring device is a pressure measuring device. The present disclosure also provides for a method for manufacturing a measuring device system, wherein the actuator is an elongated metal wire.

The present disclosure also provides for a method for manufacturing a measuring device system, wherein the adjustment cam is plastic. The present disclosure also provides for a method for manufacturing a measuring device system, wherein the adjustment cam includes at least two positive stops. The present disclosure also provides for a method for manufacturing a measuring device system, wherein the cam surface that pushes against the second actuator segment is a spline. The present disclosure also provides for a method for manufacturing a measuring device system, wherein the adjustment cam further includes a slot that retains the second actuator segment in the adjustment cam. The present disclosure also provides for a method for manufacturing a measuring device system, wherein the cam further includes a cam adjustment feature located on the front side of the bracket to allow an operator to adjust the span of the first measuring device from the front of the first measuring device with the dial face and the measuring device indicator in place on the first measuring device.

The present disclosure also provides for a measuring device sub-assembly system including: a bracket that includes an adjustment cam; a dial face mounted to the bracket; a condition responsive element that includes an element inlet and an output end configured to produce motion in response to condition changes (i) received at the element inlet and (ii) to which the condition responsive element is sensitive; an amplifier that includes a sector arm, wherein the amplifier is secured to the output end of the condition responsive element for communicating correlated but amplified motion of the condition responsive element to an indicator shaft for operating an indicator relative to condition changes on the dial face; an actuator that includes at least a first actuator segment that is positioned within an elongated slot of the sector arm for defining a pivot axis for the sector arm to enable amplifier operation; a second actuator segment of the actuator that is engagably pre-loaded against the adjustment cam to push and ride against a cam surface of the adjustment cam; and wherein the adjustment cam is configured and dimensioned so that the cam surface that pushes against the second actuator segment changes the position of the first actuator segment in the elongated slot of the sector arm when the adjustment cam is rotated to adjust the span of the indicator.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
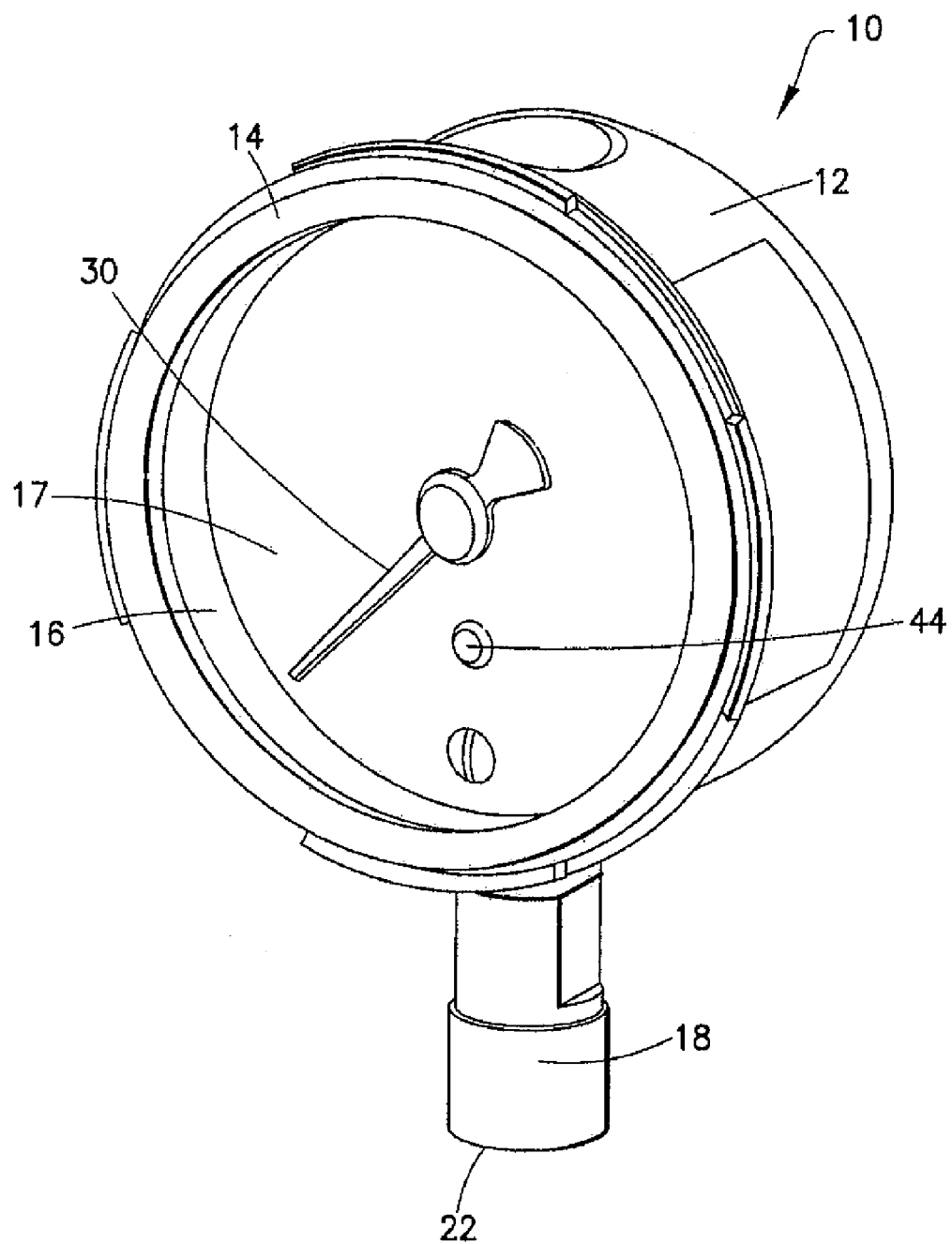
FIG. 1 is a frontal perspective view of an embodiment of a suspended movement measuring device according to the present disclosure, after assembly.

In the description which follows, like parts are marked throughout the specification and drawings with the same reference numerals, respectively. Drawing figures are not necessarily to scale and in certain views, parts may have been exaggerated for purposes of clarity.

The present disclosure provides for systems and methods for fabricating suspended movement measuring devices, e.g., a pressure gauge, thermometer or the like. More particularly, the present disclosure provides for improved systems and methods for fabricating suspended movement measuring device assemblies having span adjustment. In an exemplary embodiment, the present disclosure provides for systems and methods for fabricating suspended movement measuring device assemblies having span adjustment, wherein the measuring device may be calibrated from the front of the dial of the measuring device.

Current practice provides that the typical suspended movement measuring device manufacturer may be required to utilize costly machining operations to the socket and/or to the measuring device (e.g., mounting features for the dial, a threaded hole for a tapered screw, alignment/mounting groove for an actuator) in order to allow an operator to calibrate the measuring device with the dial in place. This machining requirement is inefficient and costly. For example, this span adjustment design/method for suspended movement measuring devices is typically only used on brass systems due to the complexity of the parts. In general, alternative parts and/or materials, such as, for example, stainless steel parts, would typically be too expensive to utilize in a like method/design.

Current practice also provides that the typical suspended movement measuring device manufacturer utilizing stainless steel parts may be required to include a wire and block assembly that is difficult to adjust and/or calibrate, and is typically susceptible to shifts in shock due in part to the construction of the assembly. In addition, such designs/methods for span adjustment for suspended movement measuring devices typically require the dial to be removed in order to allow an operator to calibrate the measuring device. Typically, this makes calibration difficult because with no dial, an operator cannot see the measurement tick or graduation marks. Another drawback to this design/method is that this span adjustment design/method generally cannot be automated.

In exemplary embodiments, the present disclosure provides for improved systems/methods for fabricating suspended movement measuring device assemblies having span adjustment wherein the systems/methods do not add costly machining operations to the measuring device, thereby reducing the cost of manufacture and providing a significant commercial advantage as a result. In exemplary embodiments, the present disclosure also provides for improved systems/methods for fabricating suspended movement measuring device assemblies, wherein the systems/methods allow the measuring device to be calibrated from the front of the dial, reduce shifts from shocks to the measuring device, and may be automated, thereby providing a significant manufacturing and commercial advantage as a result.

Referring now to the drawings, and in particular to FIG. 1, there is illustrated a suspended movement measuring device 10 depicting an embodiment of the present disclosure. For example, measuring device 10 may be a suspended movement pressure measuring device, including, but not limited to, a pressure gauge, a pressure transducer or the like. In another embodiment, measuring device 10 is a suspended movement temperature measuring device. However, suspended movement pressure or temperature measuring devices are not the only measuring devices that could be used in accordance with the principles of the present disclosure, as will be readily apparent to persons skilled in the art from the description provided herein.

For example, measuring device 10 may be coupled to a container such as a tank, a pipe, a pressurized reactor or the like from which (or for which) measurements are to be obtained. The measuring device 10 allows a condition to be measured, whether it be pressure, temperature or some other value, to be measured by a condition responsive element or measuring device mechanism 11, such as, for example, a Bourden tube or the like. In exemplary embodiments and as shown in FIG. 1, an indicator or pointer 30 is mounted on the measuring device 10, typically for rotation about the central axis of the measuring device 10 to an angular position representative of the value measured by the measuring device, whether it be pressure, temperature or some other condition.

Typically, measuring device 10 includes a case 12 interfitting with a socket 18 having a threaded stem for mounting the measuring device 10 into a threaded aperture (not shown) from which measurements are to be obtained. Typically, socket 18 includes a socket inlet 22. In general, case 12 is configured and dimensioned to house and protect the measuring device mechanism or condition responsive element 11 of measuring device 10. In one embodiment, case 12 is cylindrical. As depicted in FIG. 1, generally measuring device 10 further includes a ring 14 and a window 16. In exemplary embodiments and as shown in FIG. 1, the ring 14 seals the window 16 between the ring 14 and the case 12. Measuring device 10 typically includes a dial face 17 having graduations or measurement tick marks (not shown).

Figure 2:
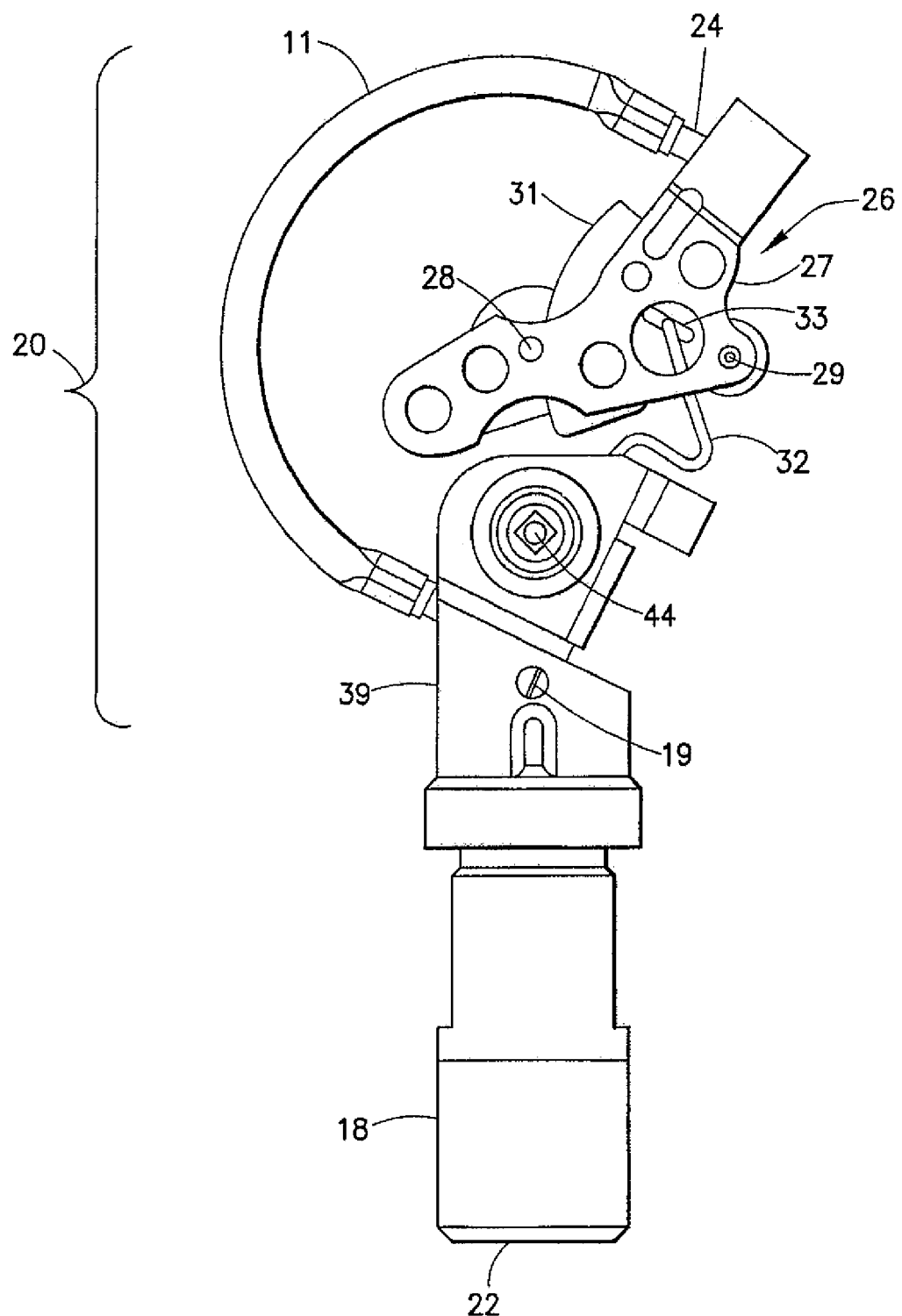
FIG. 2 is a front elevation view of a suspended movement measuring device sub-assembly according to the present disclosure.

With reference to FIGS. 2-5, there is illustrated a suspended movement measuring device sub-assembly 20 according to the present disclosure. In an exemplary embodiment, sub-assembly 20 may be assembled for use in measuring device 10. As shown in FIG. 2, sub-assembly 20 may be mounted or assembled onto socket 18.

Figure 3:
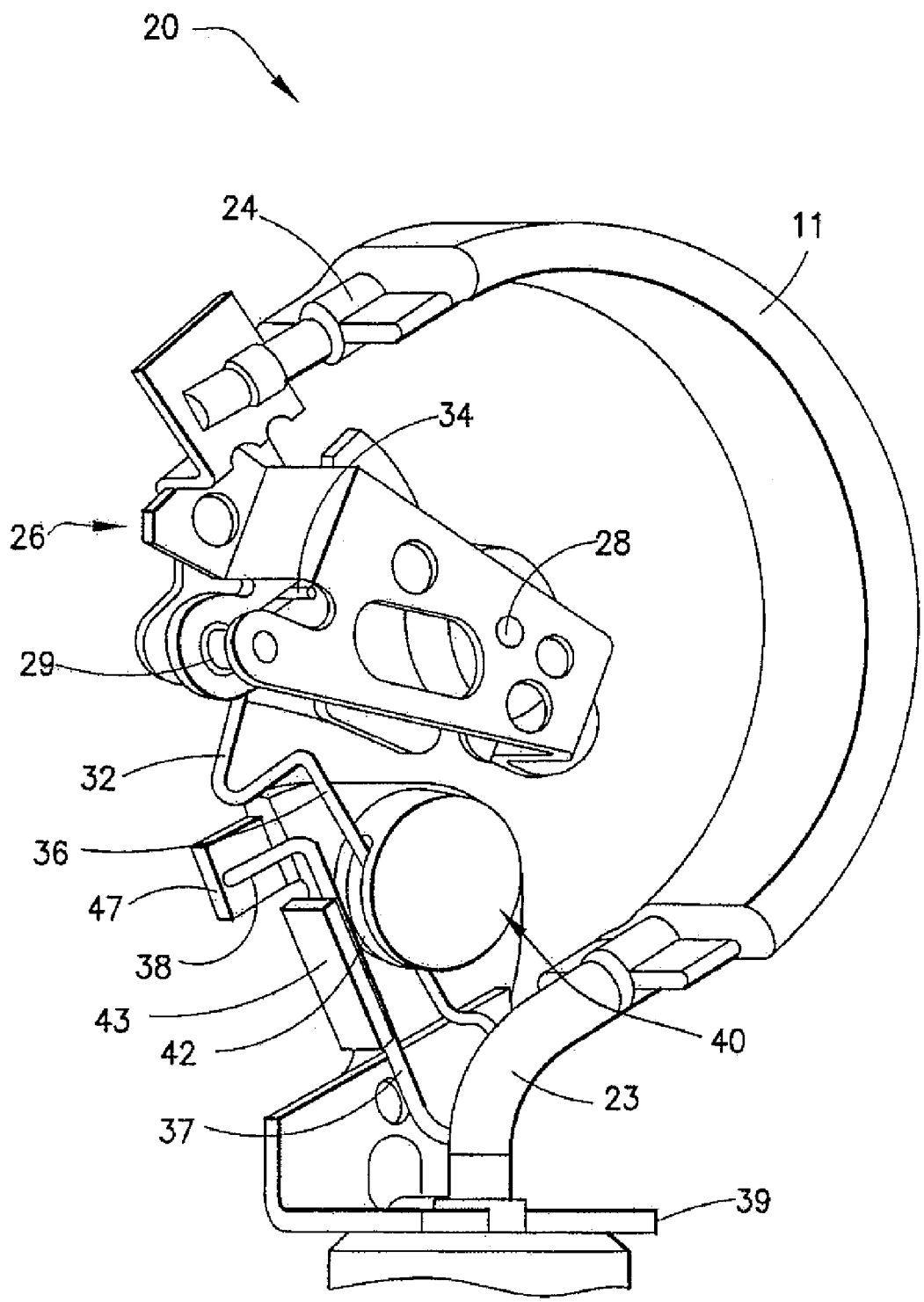
FIG. 3 is a partial rear perspective view of a suspended movement measuring device sub-assembly according to the present disclosure.
Figure 4:
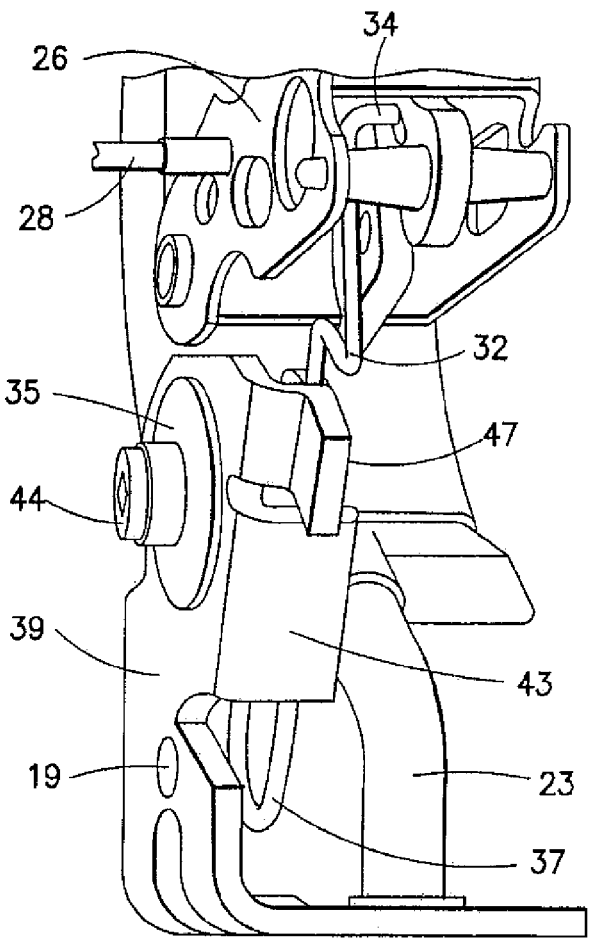
FIG. 4 is a partial side perspective view of a suspended movement measuring device sub-assembly according to the present disclosure.

In an exemplary embodiment, sub-assembly 20 includes a condition responsive element 11 that is configured to produce motion in response to condition changes to which the condition responsive element is sensitive. In one embodiment and as shown in FIGS. 2-4, sub-assembly 20 for use in a measuring device 10 (e.g., a pressure gauge) includes a condition responsive element 11 (e.g., a Bourdon tube or the like) having an output end 24 adapted or configured for displacement in correlation to the value of conditions (e.g., pressures) received at element inlet 23. Sub-assembly 20 may be configured and dimensioned for installation in a case 12 of measuring device 10, with element inlet 23 providing an appropriate inlet connection. Typically, element inlet 23 is connected to an appropriate condition source opening. In one embodiment, element inlet 23 is connected to socket 18. In an exemplary embodiment, the condition to be measured (e.g., fluid pressure) is received at socket inlet 22 and is communicated to condition responsive element 11 (e.g., a Bourdon tube or the like) having an output end 24 that is subject to arcuate motion displacement in a well known manner in response to incremental condition changes (e.g., pressure changes) received at socket inlet 22. The motion of output end 24 is conducted to amplifier 26 to produce correlated but amplified motion for operating an indicator 30 relative to condition values (e.g., pressure values) on dial face 17.

In an exemplary embodiment, condition responsive element 11 is a Bourdon tube. In one embodiment, sub-assembly 20 for use in a suspended movement pressure measuring device 10 (e.g., a pressure gauge) includes a Bourdon tube 11 having an output end 24 adapted or configured for displacement in correlation to the value of pressures (e.g., fluid pressures) received at element inlet 23. In one embodiment, Bourdon tube 11 has a composition having a wide range of service applications. In an exemplary embodiment, Bourdon tube 11 is composed substantially of stainless steel, such as, for example, 316-type stainless steel or the like.

Typically, supported from output end 24 of condition responsive element 11 is a floating amplifier 26 of a type disclosed in the '085 patent supra for operating an indicator shaft 28. For example, being supported in this arrangement, the amplifier 26 and the components that it supports are subject to a floating movement conjointly with displacement deflection of output end 24 as a result of condition changes (e.g., pressure changes) received at socket inlet 22 and/or at element inlet 23. Typically, indicator 30 is attached to indicator shaft 28. In an exemplary embodiment, arcuate displacement of the indicator 30 by operation of indicator shaft 28 reflects values of the condition measured (e.g., pressure) as represented by graduations or measurement tick marks (not shown) on dial face 17.

In an exemplary embodiment and more fully described in the '085 patent, amplifier 26 typically includes a central upright U-shaped carriage or frame 27 secured or mounted on output end 24 of condition responsive element 11 as by, for example, welding, soldering, brazing or the like. Generally, mounted in frame 27 are a pair of longitudinally displaceable rotatable shafts 28 and 29, the former of which constitutes the output drive shaft or indicator shaft 28 for operating indicator 30, and the latter of which provides hinge support or arm shaft 29 for a geared sector arm 31. Rotation of shaft 28 is effected by a pinion (not shown) secured thereto and meshing with sector gearing (not shown) of arm 31.

In an exemplary embodiment, to enable amplifier operation, an actuator 32 has a first actuator segment or portion 34 extending into the motion path of amplifier 26, and has second, third and fourth actuator segments or portions 36, 37 and 38, respectively, secured in a bracket 39 and/or in an adjustment cam 40. In one embodiment, actuator 32 takes the form of an elongated metal spring wire or link 32. Typically, actuator 32 is an elongated relatively rigid metal spring wire or link 32. In an exemplary embodiment, second, third and fourth actuator segments 36, 37 and 38 are secured in a bracket 39 and/or adjustment cam 40, and first actuator segment 34 is positioned within an elongated slot 33 of sector arm 31 for defining the pivot axis for sector arm 31.

In one embodiment, bracket 39 is an "L" shaped bracket. Bracket 39 may be attached to socket 18. In an exemplary embodiment, bracket 39 is secured or attached to socket 18 by welding, for example, or by any other fastening process (e.g., soldering, brazing or the like). In one embodiment, bracket 39 is configured and dimensioned so that the bracket 39 provides a rigid mounting platform for the sub-assembly 20. For example, when the bracket 39 is mounted or attached to socket 18, bracket 39 may be configured and dimensioned to provide a rigid mounting platform for the components of the sub-assembly 20. Bracket 39 may also provide a rigid mounting platform for the components of the sub-assembly 20 when the bracket 39 is not mounted or attached to socket 18.

As shown in FIGS. 2 and 4, bracket 39 may also be configured and dimensioned to provide a dial mount 19 for the dial face 17 of the measuring device 10. In an exemplary embodiment, bracket 39 is configured and dimensioned to provide features that allow for the mounting of adjustment cam 40 to the bracket 39. Bracket 39 may also be configured and dimensioned to provide features that allow for the actuator 32 to be mounted to the bracket 39.

Figure 5:
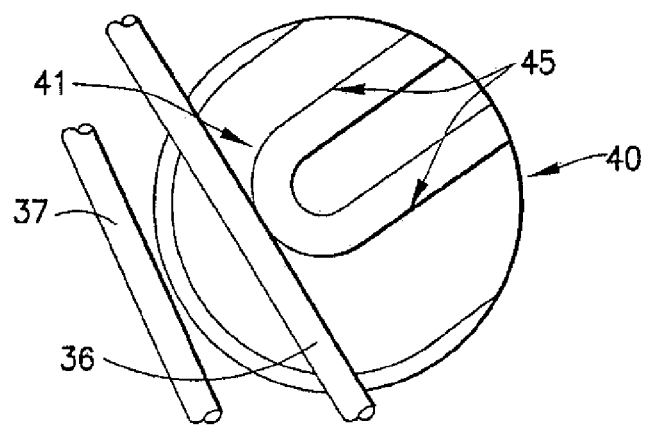
FIG. 5 is a fragmentary cross-sectional rear view of an enlargement of a suspended movement measuring device sub-assembly according to the present disclosure.

In an exemplary embodiment and as shown in FIGS. 3 and 5, sub-assembly 20 includes an adjustment cam 40. Exemplary adjustment cam 40 takes the form of a plastic adjustment cam, although the present disclosure is not limited thereto. Rather, adjustment cam 40 may take a variety of forms. In one embodiment and as depicted in FIG. 4, adjustment cam 40 is held in the bracket 39 by a washer 35. Washer 35 may be a spring washer, for example. In an exemplary embodiment, adjustment cam 40 is plastic, and washer 35 bites or grips into the plastic of adjustment cam 40 to hold the adjustment cam 40 in place, and also to put a load on the adjustment cam 40, thereby holding the adjustment cam 40 against the face of the bracket 39, which adds friction to the sub-assembly 20. This friction helps to keep the sub-assembly 20 from shifting under, for example, vibration, impact and/or shocks to the sub-assembly 20 and/or to the measuring device 10.

In an exemplary embodiment and as depicted in FIGS. 3 and 5, the bracket 39 and the adjustment cam 40 are configured and dimensioned so that the actuator wire 32 may be pre-loaded (e.g., similar to squeezing the sides of a paperclip) against the adjustment cam 40. As shown in FIGS. 3 and 5, the cam 40 may be configured and dimensioned such that the cam surface 41 that pushes against second actuator segment 36 of actuator wire 32 is offset. In an exemplary embodiment, the dimension between the push plate 43 of bracket 39 and the cam 40 varies as the cam 40 is rotated in either direction (e.g., clockwise or counter-clockwise). This allows for the change of position of the first actuator segment 34 of actuator wire 32 in the elongated slot 33 of sector arm 31, thereby adjusting the span (degrees of indicator 30 rotation) of the sub-assembly 20 and/or of the measuring device 10. In other words, rotation of the cam 40 in either direction changes the position of the first actuator segment 34 of actuator wire 32 in the geared sector arm 31, and therefore adjusts the span of the sub-assembly 20 and/or of the measuring device 10.

For example, in one embodiment, if an operator turns or rotates the cam 40 clockwise, the first actuator segment 34 of actuator wire 32 is pushed or moves toward the arm shaft 29 and the span (degrees of indicator 30 rotation) is thus increased. If an operator turns or rotates the cam counter-clockwise, the first actuator segment 34 of actuator wire 32 is pushed or moves away from the arm shaft 29 and the span is decreased. In an exemplary embodiment and as shown in FIG. 3, cam 40 further includes a slot 42 that functions as a retaining feature for second actuator segment 36 of actuator wire 32, further improving the shock resistance of sub-assembly 20 and/or of measuring device 10. In one embodiment, slot 42 retains the second actuator segment 36 in the adjustment cam 40.

In one embodiment and as depicted in FIG. 5, the cam surface 41 which the second actuator segment 36 of actuator wire 32 rides or pushes against is a spline 41, not just a constant radius. In an exemplary embodiment, spline 41 is configured and dimensioned so that "X" degrees of rotation of the cam 40 in either direction (e.g., clockwise or counter-clockwise) will always equal "Y" inches of motion at the first actuator segment 34 of actuator wire 32, regardless of where the operator is operating the second actuator segment 36 of actuator wire 32 on the cam surface 41.

In one embodiment and as shown in FIGS. 1, 2 and 4, cam 40 includes a cam adjustment feature 44. In an exemplary embodiment, cam adjustment feature 44 is located on the front side of bracket 39, so that an operator may adjust the span of sub-assembly 20 and/or measuring device 10 from the front of the sub-assembly 20 and/or from the front of the measuring device 10. Typically, cam adjustment feature 44 is configured and dimensioned to accept an adjusting tool (not shown). In an exemplary embodiment, cam adjustment feature 44 is a square drive. In one embodiment, cam 40 includes a square drive adjustment feature 44 which gives torque resistance and positive engagement with an adjusting tool (not shown) utilized in an automatic calibration station or the like, and/or utilized by an operator or calibrator.

In an exemplary embodiment and as shown in FIG. 5, cam 40 includes at least two positive stops 45. The at least two positive stops 45 may be configured and dimensioned to stop the cam from rotating or turning when the second actuator segment 36 of actuator wire 32 engages or comes in contact with either positive stop 45. In one embodiment, the at least two positive stops 45 reduces the risk of the calibrator not knowing where they are in the rotation of the cam 40. For example, in one embodiment, since the operator or calibrator typically cannot see the cam when calibrating, if the cam were allowed to rotate 360 degrees (i.e., if there were no positive stops 45), then the operator or calibrator would not be able to tell if they were high or low on the cam without pressurizing the measuring device. The inclusion of the at least two positive stops 45 on the cam 40 reduces or eliminates the risk of this from happening. In an exemplary embodiment, the at least two positive stops 45 are positioned on or near cam surface 41 of cam 40.

In one embodiment and as depicted in FIGS. 3 and 4, bracket 39 includes a bracket weld plate 47. In one embodiment, fourth actuator segment 38 of actuator wire 32 is secured or mounted on bracket weld plate 47 as by, for example, welding, soldering, brazing or the like. In an exemplary embodiment, fourth actuator segment 38 of actuator wire 32 is secured or mounted on bracket weld plate 47 to keep the actuator wire 32 from twisting or moving along the cam 40, and typically bracket weld plate 47 is not the main structural support for the actuator wire 32. In general, bracket push plate 43 of bracket 39 takes up substantially all of the spring load of the actuator wire 32, where third actuator segment 37 of actuator wire 32 engages bracket push plate 43. Typically, without the bracket push plate 43, the actuator wire 32 may bend at the weakest point of the actuator wire 32 (e.g., at the welded position on bracket weld plate 47) and therefore the actuator wire 32 may loose its elastic memory and may have diminished shock resistance if allowed to bend in this manner.

In an exemplary embodiment of the present disclosure, once sub-assembly 20 has been assembled and/or secured in or on case 12 of measuring device 10, a calibrator or operator may adjust the span of the measuring device 10 from the front of the measuring device 10 with the dial face 17 and the indicator or pointer 30 in place on the measuring device 10. For example, if an operator turns or rotates the adjustment feature 44 of cam 40 clockwise, the first actuator segment 34 of actuator wire 32 is pushed or moves toward the arm shaft 29 and the span (degrees of indicator 30 rotation) is thus increased. If an operator turns or rotates the adjustment feature 44 of cam 40 counter-clockwise, the first actuator segment 34 of actuator wire 32 is pushed or moves away from the arm shaft 29 and the span is decreased.

One advantage to at least one embodiment of the present disclosure is that a measuring device manufacturer can offer stainless steel suspended movement measuring devices allowing or having span adjustment without removing the dial, and wherein the calibration process may be automated, thereby providing a significant commercial and manufacturing advantage as a result. Another advantage to at least one embodiment of the present disclosure is that the suspended movement measuring devices of the present disclosure do not require sockets with extra features (e.g., mounting features for the dial, a threaded hole for a tapered screw, alignment/mounting groove for an actuator) which adds costly machining operations to the sockets and/or to the measuring devices. Therefore, since there is generally less costly machining operations with the suspended movement measuring device assemblies of the present disclosure, this thereby provides a cost and manufacturing advantage as a result. Another advantage to at least one embodiment of the present disclosure is that a customer or the like may easily recalibrate a suspended movement measurement device of the present disclosure, and the measurement device reduces shifts from impacts or shocks to the measuring device.

Whereas the disclosure has been described principally in connection with a Bourden tube for a pressure gauge construction, such description has been utilized only for purposes of disclosure and is not intended as limiting the disclosure. To the contrary, it is to be recognized that the amplifier is capable of use with any condition responsive element producing motion in response to condition changes to which it is sensitive.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A measuring device system comprising:
a bracket of a first measuring device that includes an adjustment cam;
a condition responsive element of the first measuring device that includes an element inlet and an output end configured to produce motion in response to condition changes (i) received at the element inlet and (ii) to which the condition responsive element is sensitive;
an amplifier that includes a sector arm, wherein the amplifier is secured to the output end of the condition responsive element for communicating correlated but amplified motion of the condition responsive element to an indicator shaft for operating a measuring device indicator relative to condition changes on a dial face of the first measuring device;
an actuator that includes at least a first actuator segment that is positioned within an elongated slot of the sector arm for defining a pivot axis for the sector arm to enable amplifier operation;
a second actuator segment of the actuator that is engagably pre-loaded against an adjustment cam to push and ride against a cam surface of the adjustment cam; and
wherein the adjustment cam is configured and dimensioned so that the cam surface that pushes against the second actuator segment changes the position of the first actuator segment in the elongated slot of the sector arm when the adjustment cam is rotated to adjust the span of the first measuring device.

2. The measuring device system of claim 1 further including a third actuator segment of the actuator and a fourth actuator segment of the actuator;
  wherein the third actuator segment cof the actuator is securely engaged with a bracket push plate of the bracket; and
  wherein the fourth actuator segment of the actuator is securely attached to a bracket weld plate of the bracket.

3. The measuring device system of claim 1 further including a socket;
  wherein the bracket is securely attached to the socket.

4. The measuring device system of claim 1, wherein the condition responsive element is a Bourdon tube and the first measuring device is a pressure measuring device.

5. The measuring device system of claim 1, wherein the actuator is an elongated metal wire.

6. The measuring device system of claim 1, wherein the adjustment cam is plastic.

7. The measuring device system of claim 1, wherein the adjustment cam includes at least two positive stops.

8. The measuring device system of claim 1, wherein the cam surface that pushes against the second actuator segment is a spline.

9. The measuring device system of claim 1, wherein the adjustment cam further includes a slot that retains the second actuator segment in the adjustment cam.

10. The measuring device system of claim 1, wherein the adjustment cam further includes a cam adjustment feature located on the front side of the bracket to allow an operator to adjust a span of the first measuring device from the front of the first measuring device with the dial face and the measuring device indicator in place on the first measuring device.

11. A method for manufacturing a measuring device system comprising:
  providing a bracket of a first measuring device that includes an adjustment cam;
  providing a condition responsive element of the first measuring device that includes an element inlet and an output end configured to produce motion in response to condition changes (i) received at the element inlet and (ii) to which the condition responsive element is sensitive;
  providing an amplifier that includes a sector arm, wherein the amplifier is secured to the output end of the condition responsive element for communicating correlated but amplified motion of the condition responsive element to an indicator shaft for operating a measuring device indicator relative to condition changes on a dial face of the first measuring device;
  providing an actuator that includes at least a first actuator segment that is positioned within an elongated slot of the sector arm for defining a pivot axis for the sector arm to enable amplifier operation;
  providing a second actuator segment of the actuator that is engagably pre-loaded against the adjustment cam to push and ride against a cam surface of the adjustment cam, and wherein the adjustment cam is configured and dimensioned so that the cam surface that pushes against the second actuator segment changes the position of the first actuator segment in the elongated slot of the sector arm when the adjustment cam is rotated to adjust a span of the first measuring device; and
  rotating the adjustment cam to adjust the span of the first measuring device.

12. The method of claim 11 further including providing a third actuator segment of the actuator and a fourth actuator segment of the actuator;
  wherein the third actuator segment of the actuator is securely engaged with a bracket push plate of the bracket; and
  wherein the fourth actuator segment of the actuator is securely attached to a bracket weld plate of the bracket.

13. The method of claim 11 further including providing a socket, and wherein the bracket is securely attached to the socket.

14. The method of claim 11, wherein the condition responsive element is a Bourdon tube and the first measuring device is a pressure measuring device.

15. The method of claim 11, wherein the actuator is an elongated metal wire.

16. The method of claim 11, wherein the adjustment cam is plastic.

17. The method of claim 11, wherein the adjustment cam includes at least two positive stops.

18. The method of claim 11, wherein the cam surface that pushes against the second actuator segment is a spline.

19. The method of claim 11, wherein the adjustment cam further includes a slot that retains the second actuator segment in the adjustment cam.

20. The method of claim 11, wherein the cam further includes a cam adjustment feature located on the front side of the bracket to allow an operator to adjust the span of the first measuring device from the front of the first measuring device with the dial face and the measuring device indicator in place on the first measuring device.

21. A measuring device sub-assembly system comprising:
  a bracket that includes an adjustment cam;
  a dial face mounted to the bracket;
  a condition responsive element that includes an element inlet and an output end configured to produce motion in response to condition changes (i) received at the element inlet and (ii) to which the condition responsive element is sensitive;
  an amplifier that includes a sector arm, wherein the amplifier is secured to the output end of the condition responsive element for communicating correlated but amplified motion of the condition responsive element to an indicator shaft for operating an indicator relative to condition changes on the dial face;
  an actuator that includes at least a first actuator segment that is positioned within an elongated slot of the sector arm for defining a pivot axis for the sector arm to enable amplifier operation;
  a second actuator segment of the actuator that is engagably pre-loaded against the adjustment cam to push and ride against a cam surface of the adjustment cam; and
  wherein the adjustment cam is configured and dimensioned so that the cam surface that pushes against the second actuator segment changes the position of the first actuator segment in the elongated slot of the sector arm when the adjustment cam is rotated to adjust a span of the indicator.

* * * * *